(12) United States Patent
Kalinski

(10) Patent No.: US 9,433,308 B1
(45) Date of Patent: Sep. 6, 2016

(54) LANDSCAPE SAFETY APPARATUS, ASSOCIATED COMBINATIONS, METHODS, AND KITS

(71) Applicant: Landscape Safety Systems LLC, San Jose, CA (US)

(72) Inventor: James Jeffrey Kalinski, San Jose, CA (US)

(73) Assignee: Landscape Safety Systems LLC, San Jose, CA (US)

( * ) Notice: Subject to any disclaimer, the term of this patent is extended or adjusted under 35 U.S.C. 154(b) by 0 days.

(21) Appl. No.: 14/997,552

(22) Filed: Jan. 17, 2016

Related U.S. Application Data

(60) Continuation-in-part of application No. 14/288,928, filed on May 28, 2014, now abandoned, which is a continuation-in-part of application No. 13/269,535, filed on Oct. 7, 2011, now abandoned, which is a division of application No. 13/049,884, filed on Mar. 16, 2011, now abandoned.

(51) Int. Cl.
*A47G 5/02* (2006.01)
*F16P 1/02* (2006.01)
*E06B 9/40* (2006.01)
*E06B 11/04* (2006.01)

(52) U.S. Cl.
CPC . *A47G 5/02* (2013.01); *E06B 9/40* (2013.01); *F16P 1/02* (2013.01); *E06B 11/04* (2013.01)

(58) Field of Classification Search
CPC ............ A47G 5/02; F16P 1/02; E06B 11/04; E06B 9/40
USPC ....... 160/23.1, 24, 29, 46, 66, 238, 313, 318
See application file for complete search history.

(56) References Cited

U.S. PATENT DOCUMENTS

| | | | |
|---|---|---|---|
| 6,807,999 B1* | 10/2004 | Bowen | E01F 13/028 160/24 |
| 2007/0124993 A1* | 6/2007 | Johnson | A01G 13/0225 47/29.5 |
| 2007/0176158 A1* | 8/2007 | Robinson | E01F 13/028 256/12.5 |
| 2009/0008047 A1* | 1/2009 | Mayworm | E04G 21/30 160/351 |

* cited by examiner

*Primary Examiner* — Blair M Johnson
(74) *Attorney, Agent, or Firm* — Louis Wu

(57) ABSTRACT

A landscaping device and shield apparatus combination is provided. The landscaping device is powered by an engine and/or motor capable of hurling upward flying debris. The apparatus includes supports, each having an upper end and a lower end. Bases each having a rod insertable up to a bulge into the lower ends of the supports are provided to maintain the supports in a substantially vertical orientation. Also included are: a flexible screen and a retraction mechanism. The retraction mechanism has a construction such so as to provide an automatic locking and automatic retraction assist that a second support may be temporarily locked, and later pulled toward the first support, as desired The landscaping device excludes a stump grinder.

20 Claims, 14 Drawing Sheets

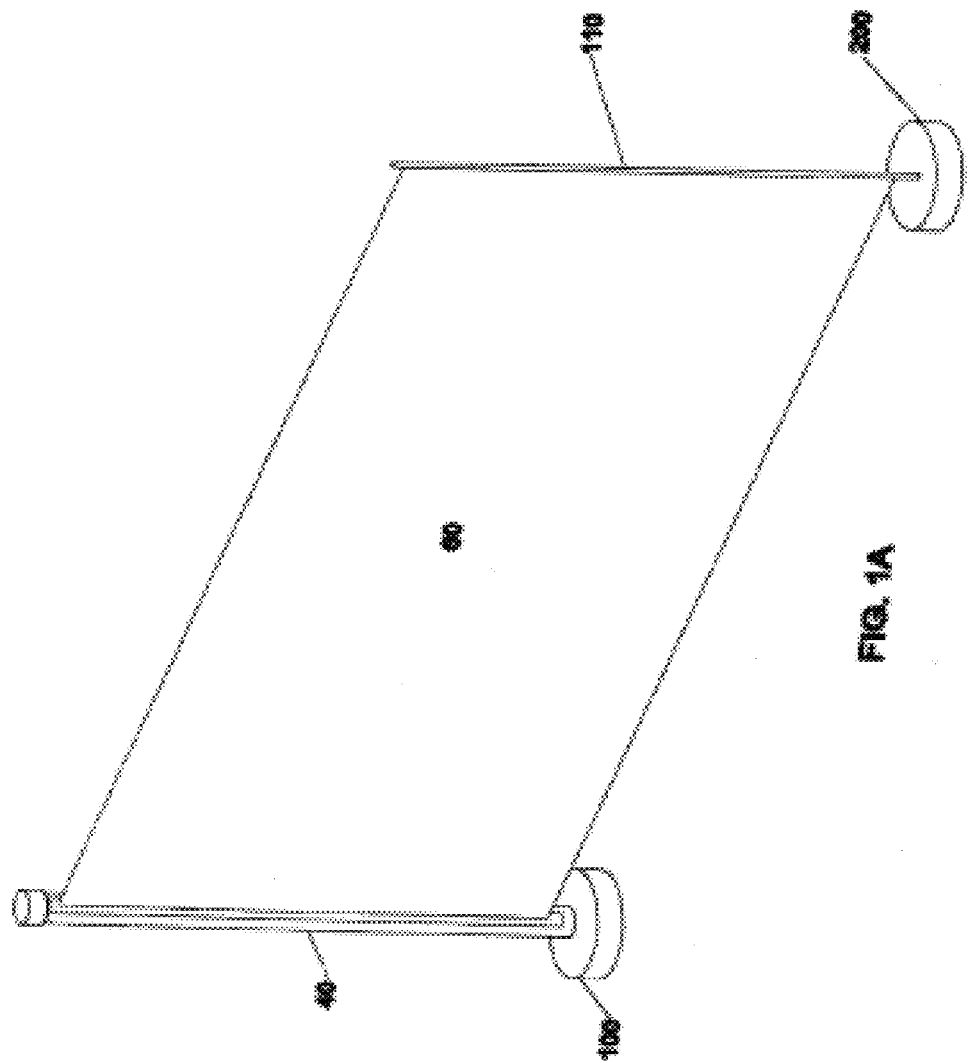

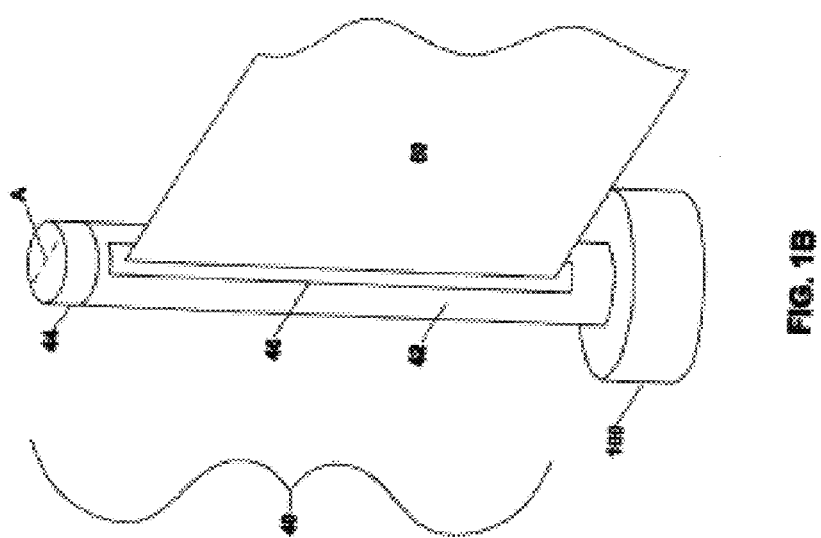

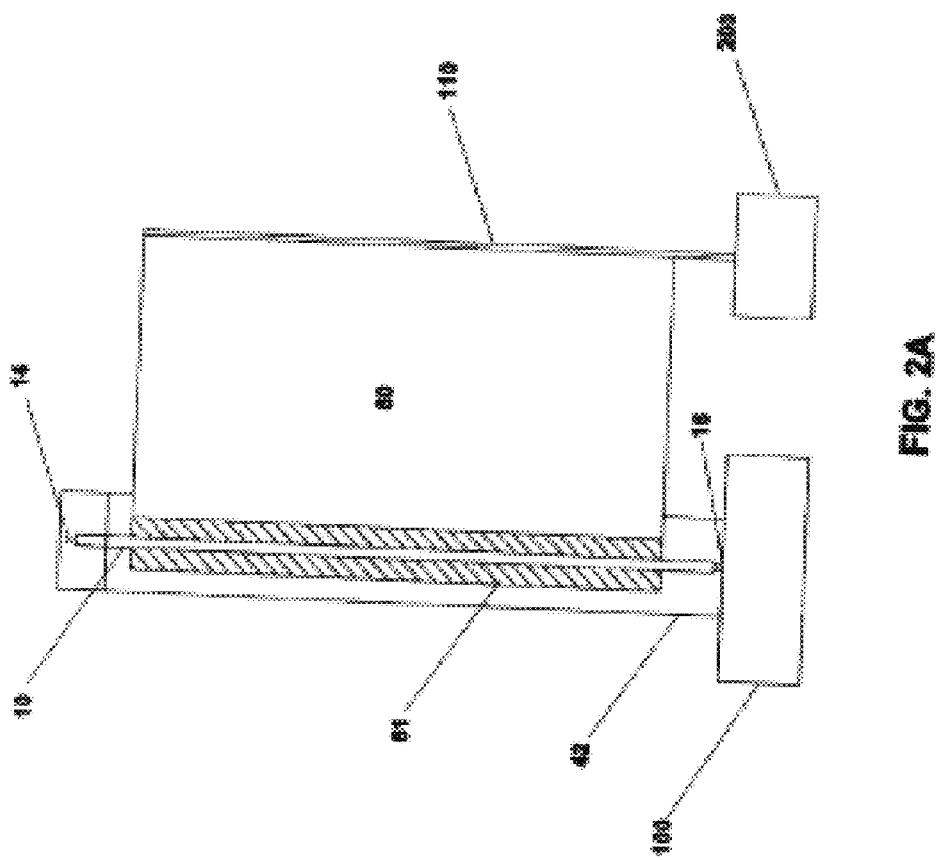

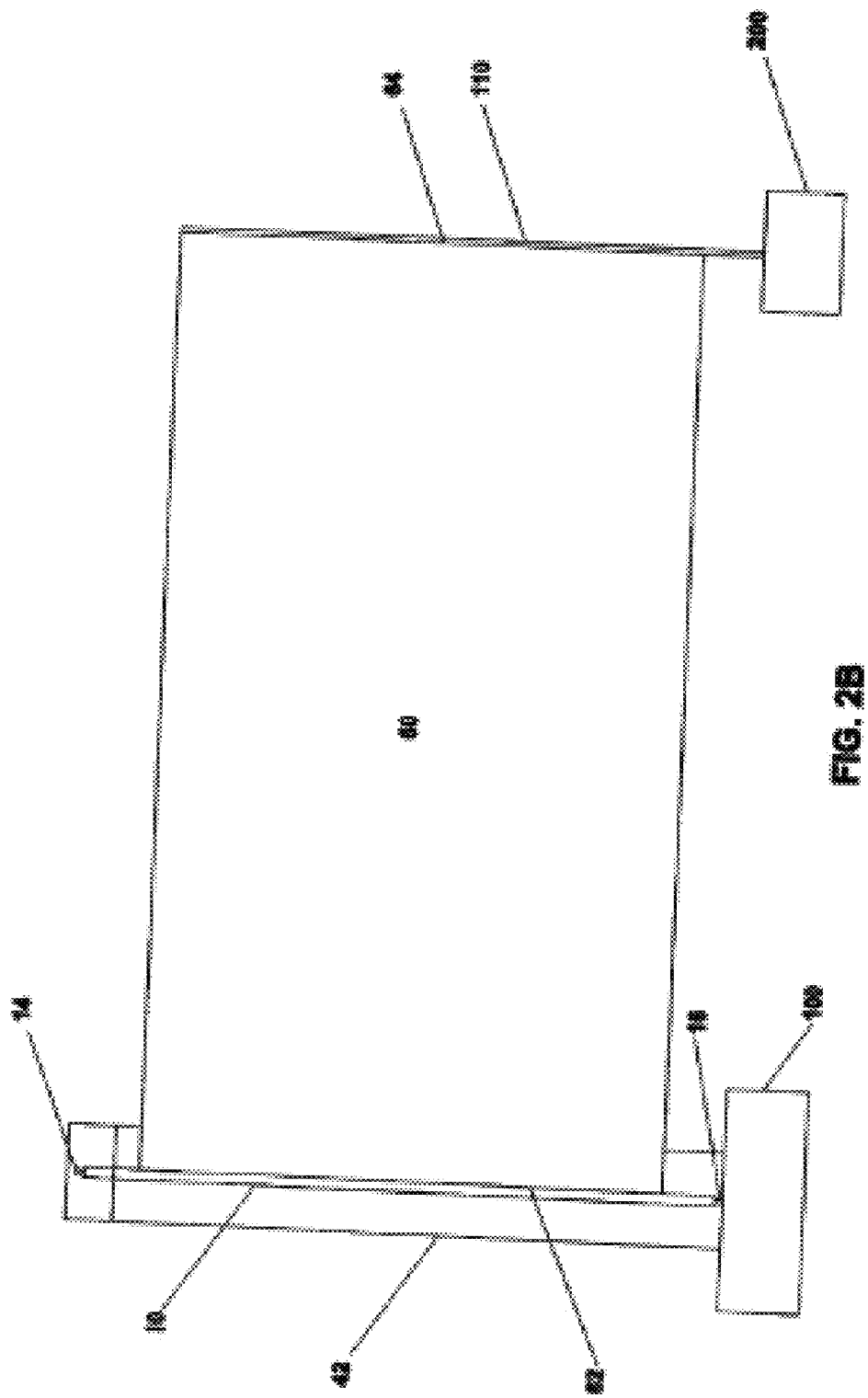

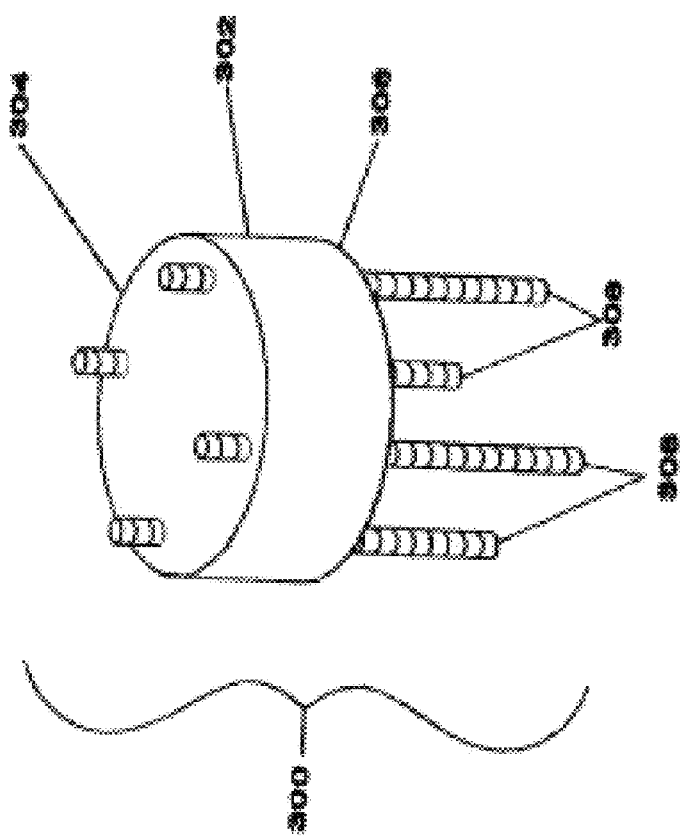

LANDSCAPE SAFETY APPARATUS, ASSOCIATED COMBINATIONS, METHODS, AND KITS

CROSS REFERENCE TO RELATED APPLICATIONS

This is a continuation-in-part of U.S. patent application Ser. No. 14/288,928, entitled "GARDENING SAFETY APPARATUS AND METHOD," filed May 28, 2014, which is a is a continuation-in-part of U.S. patent application Ser. No. 13/269,535, entitled "LANDSCAPE SHIELD APPARATUS AND METHOD," filed Aug. 7, 2011, which is a divisional of U.S. patent application Ser. No. 13/049,884, entitled "LANDSCAPE SHIELD APPARATUS AND METHOD," filed Mar. 16, 2011, the disclosures of which are hereby incorporated by reference in their entirety.

BACKGROUND OF THE INVENTION

The invention relates generally to landscaping apparatuses and to methods that provide for a safety measure associated with the use of power landscaping devices. More specifically, the invention relates to the use of power landscaping devices with landscaping apparatuses having a flexible screen to block high velocity debris hurled by the landscaping device from traveling through the screen, thereby protecting bystanders and property from such debris.

Numerous individuals are treated in hospital emergency rooms for injuries relating to various lawn and garden devices annually. Riding lawnmowers and garden tractors, alone, account for the injury and/or death of tens of thousands individuals each year. In addition, landscaping injuries can arise through a number of other routes as well. In addition, almost 40% of all eye injuries happen while people doing yard work. As a result, Occupational Safety and Health Administration (OSHA), a part of the United States Department of Labor has come up with a number of standards relating to landscape and horticultural services to ensure safe and healthful working conditions. Exemplary OSHA standards relating to landscaping practices include, e.g., provisions directed to personal protective equipment such as head protection, eye and face protection, hearing protection hazard communication, and hand and portable powered tools, other hand-held equipment.

In addition, Section 5(a) of the OSH Act (29 USC §654), often referred to as the General Duty Clause, requires employers to "furnish to each of his employees employment and a place of employment which are free from recognized hazards that are causing or are likely to cause death or serious physical harm to his employees." This section may be used to cite hazards for which there are no specific standards, such as ergonomics associated with gardening devices and apparatuses. There are no OSHA standards for protecting passersby and bystanders.

A string trimmer is a powered handheld landscaping device that uses a flexible monofilament line instead of a metallic blade for cutting grass and other plants near objects. String trimmers typically include a cutting head at the end of a long shaft with a handle or handles and sometimes a shoulder strap. String trimmers may be powered by an internal combustion engine or have an electric motor in the cutting head.

In use, the head of string trimmers spins a monofilament line at a high rate of speed to cut plant matter. A string trimmer works on the principle that centrifugal force resulting from spinning the head of a string trimmer can increase the effective stiffness of the line extending from the head. The faster the head turns, the stiffer the line. Even nylon lines having a round cross-sectional area is able to cut grass and slight, woody plants quite well. Some monofilament lines, designed for more powerful cutters, have an extruded shape—like a star—that enhances the cutting ability of the line. As a result, professional grade string trimmers are sometimes used to cut quite large woody plants such as small shrubs.

String trimmers have become popular tools for trimming grass and weed areas that cannot be reached by a lawn mower. Owners of trimmers also use them to edge vertically, or at some lesser angle than vertical, the edges of curbs, sidewalks and driveways and mulched beds. String trimmers are often used near buildings and windows. Accessories for use with string trimmers include, for example, edging guides that, as described in U.S. Pat. No. 6,351,930 to Byrne et al., facilitate a consistent edge along lawns.

As with any power tool such as mowers, blowers, and rototillers, string trimmers are capable of causing injury if not used in a safe manner. Improper operation of string trimmers is hazardous because the rotating cutting string is exposed. The exposed cutting string has been known to occasionally hit the leg of the operator of the trimmer, thus causing injury to the operator's leg.

Thus, users of power tools should personal protection equipment during the tools' use. Standard protective gear for use with power tools include, e.g., hearing protection and eye protection such as safety glasses, goggles, or a face shield. Gloves are also useful to damp out vibrations. For string trimmers in particular, long trousers and sturdy shoes at a minimum should be worn. The string will at least sting if allowed to contact bare legs or feet. Additional protective apparel for the lower leg and knee is described U.S. Pat. No. 6,405,383 to Heller et al.

Guards for use with string trimmers are known in the art. For example, most string trimmers are provided with a small, relatively flat, attached string guard that encircles a rearward portion of the arc encompassed by the string. While these guards may, to some extent, prevent a user from inadvertently causing the rotating string from coming into contact with legs or feet of the user, these guards do little to prevent cuttings from being thrown toward the bystanders and passersby. In contrast, U.S. Pat. No. 6,226,876 to Ezell describes a landscaping barrier for string trimmers. The barrier is constructed for fit onto a shaft of a hand-held string trimmer. The barrier typically functions to block grass, weed and other debris generated from operation of the string trimmer from being thrown onto legs and feet of an individual using the string trimmer.

Known string-trimmer guards and debris barriers suffer from a number of drawbacks not addressed by prior art technologies. In general, guards and barriers that are attached to string trimmers do not block all debris arising from the operation of trimmers. In addition, some users of string trimmers remove such guards. Furthermore, while prior art technologies generally focus on protecting users of string trimmers, there is a need to protect bystanders and passersby from debris generate by string trimmers, particularly since professional-grade string trimmers may throw objects with uncontrolled trajectories associated with considerable force and velocity imparted by the trimmers. Since string trimmers are often used to carry out landscape maintenance for commercial property such as schools, apartment complexes, business parks, and the like, stray flying debris may lead to lawsuits and complaints filed by injured pedestrians and owners of nearby property, e.g., cars, windows, etc.

Similarly, stump grinding debris containment structures described in U.S. Patent Application Publication No. 20090008047 to Mayworm, which was never issued as a U.S. patent, also are unsuited to block debris generated from the operation of landscaping devices such as string trimmers. As an initial matter, it is well known stump grinding is not generally considered an ordinary landscaping or gardening practice. Instead, stump grinding is an infrequent arboreal activity. In addition, stump grinders operate at a lower speed of rotation than string trimmers. Typically, small stump grinders operate at a rotational speed closer at less than about 1000 revolutions per minute (RPM). In contrast, string trimmers, with their comparatively high rotational speed of approximately 7500 to about 9500 rpm, may hurl debris at greater velocities. Furthermore, stump grinders employ rigid cutting wheels or blades that are maintained in a generally fixed angle relative to the stump that they are supposed to grind. As a result, stump grinders generally do not generate high-flying debris. Instead, debris is flung in a generally uniform manner, i.e., in a generally downward direction. See, e.g., https://www.youtube.com/watch?v=O8wvneMZN-0.

In contrast, landscapers of ordinary skill in the art will recognized that the angle of string rotation may vary depending how the trimmers are held. In addition, the string may bend as it strikes the ground or other solid objects, thereby providing another variable to how the trajectory of debris may be altered. As a result, string trimmers tend to hurl debris in a spray of uncontrolled trajectories. In other words, the Mayworm containment structure is not suitable for blocking a high-flying trajectory from string trimmers.

Accordingly, opportunities exist to provide solutions to the above-described shortcomings associated with known gardening and landscaping technologies.

SUMMARY OF THE INVENTION

In a first aspect, a landscaping device and shield apparatus combination is provided. The landscaping device, e.g., a handheld power device such as a blower or a string trimmer, is powered by an engine and/or motor capable of hurling debris during operation up to a height of at least about 18 inches. In addition, the landscaping device excludes a stump grinder and is, during operation, located within about 20 feet of the shield apparatus. The shield apparatus comprises first and second supports, each support having an upper end and a lower end. Also included are first and second bases each having a rod insertable up to a bulge into the lower ends of the first and second supports, respectively. The bases have a construction to maintain the supports in a substantially vertical orientation above the bulges. A flexible screen having opposing vertical edges is attached to the first and second supports. The screen is effective to block debris hurled by the landscaping device from traveling through the screen. Also provided is a retraction mechanism associated with the first support. The retraction mechanism has a construction such that the second support may be automatically locked relative to and automatically pulled toward the first support, as desired. The retraction mechanism may retract the screen by way of rotational motion.

Typically, the screen has a height of about 4 feet to about 7 feet and is comprised of a polymeric material. For example, the screen may be wind permeable. In addition, the screen may have about a 400 to about a 480 warp and/or about a 340 to about a 380 fill. In some instances, openings in the screen may not exceed about $1/40$ of a square inch.

The bases may vary in construction. For example, the base may a hardscape construction comprising a disk having a vertical rod insertable up to a bulge into the lower ends of the first or second supports. Alternatively, the base may have a softscape construction comprising a stake and a crossbar located below a vertical rod insertable up to a bulge into the lower ends of the first or second supports. In any case, the base may allow the first support to pivot 360 degrees in any direction.

In some instances, at least one additional support may be provided having an upper end and a lower end and being physically associated with a portion of the screen located between the opposing vertical edges. Such an additional support may be have an additional base having a vertical rod insertable into the lower end of thereof. Typically, no support is located at a distance greater than about 20 feet from at least one other support.

A housing may be associated with the first support and/or retraction mechanism. For example, the housing may be integral to the first support. In addition, the housing may have a size effective to contain the entire screen upon retraction. Furthermore, a plurality of handles may be provided. For example, a first handle may be attached to the retraction mechanism, a second handle may be attached to the housing, and a third handle may be attached to the screen and/or the second support.

In another embodiment, a landscaping method is provided. The method involves identifying a grounds region for using a landscaping device powered by an engine and/or motor capable of hurling debris during operation up to a height of at least about 18 inches. A shield apparatus is transported to the region. The shield apparatus comprises first and second supports, each support having an upper end and a lower end, first and second bases each having a rod insertable up to a bulge into the lower ends of the first and second supports, respectively, the bases having a construction to maintain the supports in a substantially vertical orientation above the bulges, a flexible screen having opposing hems attached to the first and second supports, the screen having sufficient strength to block debris hurled by the device from traveling through the screen, and a retraction mechanism associated with the first support, the retraction mechanism having a construction such that the second support may be automatically locked relative to and automatically pulled toward the first support, as desired. The rods of the first and second bases are inserted into the lower ends of the first and second supports. The first and second supports are positioned in a substantially vertical orientation at different locations bounding the region while automatically locking the screen in a substantially taut manner between the supports. The handheld landscaping device is used in the region at a location no greater than about 20 feet from the apparatus, thereby allowing the apparatus to blocking debris hurled by the apparatus up to a height exceeding at least about 18 inches from hitting passersby, bystanders and/or property located outside the grounds region. The retraction mechanism is activated to automatically pull the second support toward the first support.

In a further embodiment, a shield apparatus kit is provided. The kit includes first and second supports, each support having an upper end and a lower end. Also included is a set of hardscape and softscape bases for the first and second supports, each base having a rod insertable up to a bulge into the lower ends of the first and second supports, respectively, to maintain the first and second supports in a substantially vertical orientation above the bulges. A flexible screen having opposing vertical edges is attached to the first and second supports, wherein the screen is effective to block debris hurled by the landscaping device from traveling through the screen. At least one additional support having an upper end and a lower end is physically associated with a portion of the screen located between the opposing vertical edges. A set of hardscape and softscape bases for the at least one additional support, wherein each base has a rod insertable into the lower end of the at least one additional support to maintain the at least one additional support in a substantially vertical orientation. The kit also includes a retraction mechanism associated with the first support, the retraction mechanism having a construction such that the second support may be automatically locked relative to and automatically pulled toward the first support, as desired.

BRIEF DESCRIPTION OF THE DRAWINGS

FIG. 1A is a diagram illustrating an embodiment of the shield apparatus.

FIG. 1B is a diagram illustrating an embodiment of a housing for the shield apparatus.

FIG. 2A and FIG. 2B are diagrams illustrating an embodiment of the shield apparatus with a housing in cross-sectional view. FIG. 2A depicts the apparatus in a partially retracted configuration. FIG. 2B depicts the apparatus in an expanded configuration.

FIGS. 3A and 3B are diagrams illustrating embodiments of bases for the shield. FIG. 3A is a diagram illustrating an embodiment of one base for the shield apparatus and FIG. 3B is a diagram illustrating an embodiment of an alternative base for the shield apparatus.

FIG. 5A depicts the shield in exploded view. FIG. 5B depicts the shield apparatus in an assembled, deployed view.

FIG. 7A shows a base having a hardscape construction for the first or second support. FIG. 7B shows a base having a softscape construction for the first or second support. FIG. 7C shows a base having a hardscape construction for an additional support. FIG. 7D shows a base having a softscape construction for an additional support.

DETAILED DESCRIPTION OF THE INVENTION

Figure 3B:
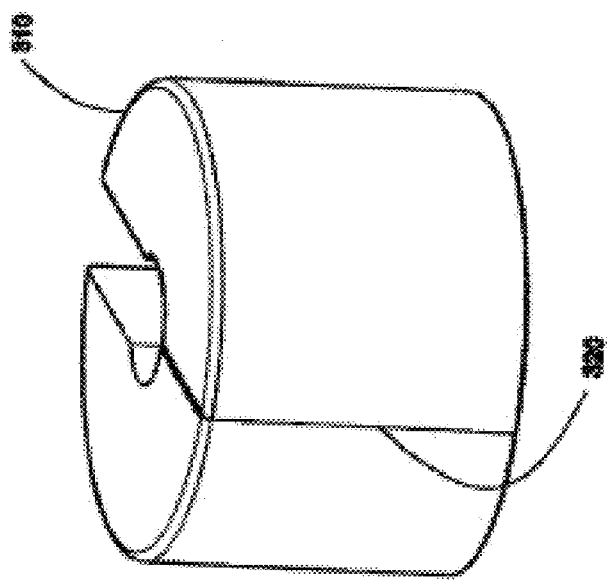

In general, the invention relates to shield apparatuses that may be used to protect passersby, bystanders, and physical property, e.g., cars and windows, against harm arising from flying debris. The apparatus includes first and second supports having upper and lower ends, a flexible screen, and a retraction mechanism, typically associated with the first support. The screen has opposing vertical edges attached to the supports. The retraction mechanism has a construction that may allow the second support to be pulled toward the first support, e.g., by way of the screen.

In operation, the shield apparatus may be transported to a grounds region where a device prone to hurl high-flying debris of differing trajectories may be used. The supports are positioned in a substantially vertical orientation at different locations bounding the region, while the screen is maintained in a substantially taut manner between the supports. The screen may serve to block debris hurled during use of the device in the region. Once work is completed, the retraction mechanism may be activated to return the apparatus to a more easily portable and/or transportable configuration.

The invention is useful in industries such as gardening, landscaping, and etc., where debris may be generated and/or hurled by motorized handheld equipment. Notably, the invention finds use in places where landscape maintenance is being conducted, e.g., schools, apartment complexes, business parks, etc.

For example, during the operation of string trimmers, their heads spins at an extremely high rate of speed. As a result, objects such as rocks, glass and debris may be hurled at extremely high velocities and or with great force, thereby causing damage to people, cars and or buildings, etc. A search of court records will reveal that there are numerous law suits and complaints filed annually by pedestrians who are hurt as well as by owners of cars whose paint jobs are marred due to flying debris.

Thus, whenever a landscaper may contemplate operating a string trimmer at a ground region where there is a risk of pedestrians and/or property, e.g., windows, cars, etc., being hit by flying debris, the landscaper may place the inventive apparatus in use in proximity to the string trimmer, e.g., by locating the apparatus within 1, 3, 5, 10, 15, or 20 feet of the string trimmer. For example, the landscaper may anchor the shield apparatus in the ground, extend the screen, and start working. The screen will serve to catch flying debris of differing trajectories being created by the string trimmer. As a result, harm to people and property is eliminated or reduced.

Before describing the invention in conjunction with the figures, it should be noted that the description and figures are provided to illustrate examples of the invention, and do not limit the scope of the invention. The figures are not necessarily drawn to scale, and certain dimensions may be exaggerated for clarity of presentation. Further, as used in this specification and the claims, the singular article forms "a," "an," and "the" include both singular and plural referents unless the context clearly dictates otherwise. Thus, for example, reference to "a support" includes more than one support as well as a single support, reference to "a base" includes a single base as well as more than one base, etc.

FIG. 1A is a diagram illustrating an embodiment of the shield apparatus. In the embodiment shown in FIG. 1A, the shield apparatus includes a screen 60, a support 110, a housing 40 and bases 100 and 200. FIG. 1B is a diagram illustrating the housing 40 in further detail. The housing 40 includes an end cap 44 and a hollow tube 42. The screen 60 traverses through an opening 46 of the hollow tube 42. The end cap 44 and tube 42 may be made from ordinary structural materials such as plastics, e.g., polyvinyl chloride (PVC), acrylonitrile-butadiene-styrene plastic (ABS), etc., fiberglass, metals, e.g., aluminum, rolled steel, or other appropriate materials.

FIG. 2A and FIG. 2B are diagrams illustrating the housing 40 shown in FIG. 1B in cross sectional view along dotted A. FIG. 2A shows an example of a shield apparatus with the screen in a retracted configuration. FIG. 2B shows an example of a shield apparatus with the screen in an extended configuration.

As shown in FIGS. 2A and 2B, the shield apparatus includes an additional support 10 which may be located inside the housing. A cylindrical post may be used for the supports 10 and 110 as illustrated in FIGS. 2A and 2B, however, as would be well understood in the art, the support may comprise other shapes. A non-exclusive list of supports includes cylindrical wooden posts, telescoping poles, fiberglass poles, carbon fiber poles, etc. The supports 10 and 110 are comprised of a material that is strong enough to support the shield apparatus in a substantially vertical position when the screen is extended. A non-exclusive list of examples of materials for the supports 10 and 110 includes wood, aluminum or other metals, fiberglass, carbon fiber, and other appropriate materials. One of ordinary skill in art would be able to determine a proper shape and material for the support without undue experimentation.

"Substantially vertical position" is used in its ordinary sense to refer broadly to items that are more or less, but not necessarily precisely, aligned with the direction of the force of gravity, as materialized with a plumb line. The words "substantial" and "substantially" are used analogously in other contexts involving analogous definitions.

As shown in FIG. 2B, the screen 60 has opposing vertical edges 62 and 64. The term "vertical edge" is used in its ordinary sense to refer broadly to an edge, border, piping, hem, etc., located along the screens width as illustrated by 62 and 64. Support 10 is attached to vertical edge 62 and support 110 is attached to vertical edge 64. As used in this context "attached" is meant broadly and may refer to an indirect attachment as well as a direct attachment. As shown in FIG. 2, in some embodiments, the two supports 10 and 110 may have a length that is substantially equal. Some embodiments may, but need not, include a handle or other mechanism (not shown) attached to the support 110 to assist in extending the screen when the shield apparatus is in use.

FIGS. 2A and 2B also include an illustration of an example retraction mechanism for the shield apparatus. The retraction mechanism allows one of the supports to be pulled towards the other support, for example by way of the screen. In the embodiment shown in FIGS. 2A and 2B, support 10 includes an upper roller pin 14 and a lower roller pin 16. The upper roller pin 14 is attached to the end cap 44, and the lower roller pin is attached to the base 100. The upper and lower roller pins are attached such that the support 10 can rotate, while the hollow tube 42 (attached between the end cap 44 and the base 100) remains immobile.

In some embodiments, as discussed below in detail, the retraction mechanism may also include a spring mechanism similar to that found in pull-down projection screens or pull-down window blinds. In other embodiments, a built-in inertia reduction mechanism may be included. In operation, the screen 60 unrolls in a conventional manner when a user pulls support 110 away from support 10. Once the pulling action ceases, an automatic locking mechanism may be used to temporarily lock the screen in place. In such embodiments, an additional tug on the second support may deactivate the locking mechanism to allow the retraction mechanism to slowly and gently retract the screen to the closed position on its own via rotational motion.

In the embodiment illustrated in FIGS. 1A, 1B, 2A, and 2B, when the screen is extended, it has a generally rectangular shape. When the screen is retracted, the bulk of the screen 60 is wound against the support 10 such that the screen forms a roll 61 about the roller 10, as shown in FIG. 2A. As a result, the vertical edge is covered by layers of the screen when retracted. When the screen is extended as shown in FIG. 2B, the vertical edge 62 remains within the housing 40, but the screen 60 traverses through the housing opening 46 of FIG. 1B, and the bulk of the screen is positioned outside housing 40.

As would be understood by one of skill in the art, other retraction mechanisms may be used. For example, in some embodiments, the screen may be retracted via nonrotational motion, e.g., via folding action. Additionally, in some embodiments the screen may be manually rolled from one support to another.

In some embodiments, the shield apparatus may be easily disassembled and reassembled so that the parts can be easily replaced. For example, in some embodiments, the retraction mechanism may be constructed in a manner that allows for easily replacing damaged screens and the like. In some embodiments, the end cap 44 may be removable.

As shown in FIGS. 2A and 2B, the supports 10 and 110 are each associated with a base 100 and 200, respectively. In general, the bases are constructed to maintain the supports in a substantially vertical position during the use of the inventive apparatus.

FIG. 3A is a diagram illustrating an example of a base that may be used in some embodiments. Base 300 is shown having a base plate 302 having upper and lower horizontal surfaces indicated by 304 and 306. Also provided is a plurality of stakes 308. In some embodiments, the stakes extend through and engage the base plate 302 via screw threads. In some such embodiments, by turning the stakes 308 relative to the base plate 302, the stakes' positions may be adjusted relative to the base plate 302. For example, the stakes' may be positioned such that the majority of their exposed length lies below surface 306. Alternatively, the stakes' position may be raised such that the majority of their exposed length lies above surface 304.

For embodiments using a base such as the one illustrated in FIG. 3A, the stakes may be driven into the ground so that screen stays in a substantially vertical position. For some embodiments, a user of the apparatus shield may step on the horizontal surface of the base to drive the stakes associated therewith into the ground. Alternatively, hammers and other tools may be used to drive the stake downward. For such embodiments, the bases should be made from materials that can withstand the forces associated with their use. For example, if hammers are to be used to drive the stakes of the bases into the ground, the stakes should be made of a sufficiently strong material, e.g., steel, to withstand the forces resulting from impact with hammers. If the length of the stakes is adjustable, changing the length of the stakes so that less is below the base 302 may allow the base to be driven into the ground more easily. Changing the length of the stakes so that more is below the base may provide more stability to the supports.

FIG. 3B is a diagram illustrating an alternative embodiment of a base. The base illustrated in FIG. 3B includes a Tillable compartment that may be filled, e.g., with substances such as water, rocks, sand, and/or soil. As illustrated, the fillable base comprises hollow compartments 310 each having an opening through which substances for weighting down the base may be introduced. In some embodiments, the compartments may be joined by a hinge 320. The hinge allows the compartments 310 to swing open and closed around the lower end of supports of the inventive apparatus. Once filled, the base should possess sufficient weight to render any support attached thereto upright when the base is placed on a hard surface.

The bases 100 and 200 may be affixed to, restrained with, or otherwise attached to the supports 10 and 110. In some embodiments, the base may include an integrated support socket (not shown) which may be used to mobilize the lower end of supports 10 and 100. In some embodiments, base and support attachment may be made permanent. Alternatively, the bases and supports may be made detachable from each other. Base and support attachment may be made directly or indirectly. For example, in the embodiments illustrated in FIGS. 1A, 1B, 2A and 2B, support 110 may be attached to the base 200 directly, for example by inserting and affixing the support's lower end directly in a support socket in the base (not shown), and support 10 may be attached to base 100 indirectly, via a housing.

Figure 4:
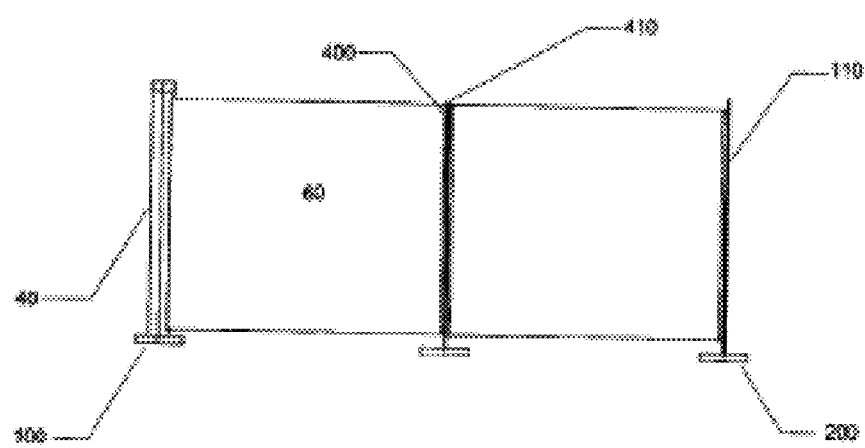
FIG. 4 is a diagram illustrating an embodiment of an additional support for the shield apparatus.

In some embodiments, additional supports and bases may be physically associated with a portion of the screen located between the supports attached to the vertical edges. The additional supports may be attached to the screen in any of a number of ways. For example, at the place for attaching the additional supports, the screen may include loops, casings, piping, hems or other appropriate means for attaching the supports. In some embodiments, supports may be placed approximately 20 feet apart or less, i.e. there will be about 20 feet or less distance between any two supports. FIG. 4 is a diagram illustrating an embodiment of the shield apparatus in FIG. 1 with an additional support 410. In the embodiment illustrated in FIG. 4, the extra support 410 is attached to the screen with a casing as illustrated at 400. In some embodiments, the supports may be evenly spaced. In some embodiments, supports may be placed more than 20 feet apart, depending in part on the materials used for the screen and the supports. One of ordinary skill in art would be able to determine without undue experimentation the proper placing of the distance between the supports so that the screen may be maintained substantially taut and in a substantially vertical position.

In some embodiments, the shield apparatus may be constructed so that it is portable. "Portable" is used in its ordinary sense to refer broadly to items that may be transported in a relatively easy manner. In such embodiments, a housing may be included, such as the housing illustrated at 40 of FIG. 1. In some such embodiments, the housing may include a handle. In embodiments that are portable, the weight of materials will be a factor for choosing the materials for constructing the shield apparatus. For example, in some embodiments, the screen may be constructed of a fairly light material. In some portable embodiments, the weight of the shield apparatus may be around 20 pounds or less. For example, in some embodiments, the shield apparatus may weigh between 5 and 15 pounds.

In some embodiments, the shield may be heavier than 20 pounds based in part on the length and width of the screen. For example, a standard professional grade version of the invention may weigh up to about 40 pounds. A carbon-fiber version may weigh about 25-30 pounds.

Figure 5A:
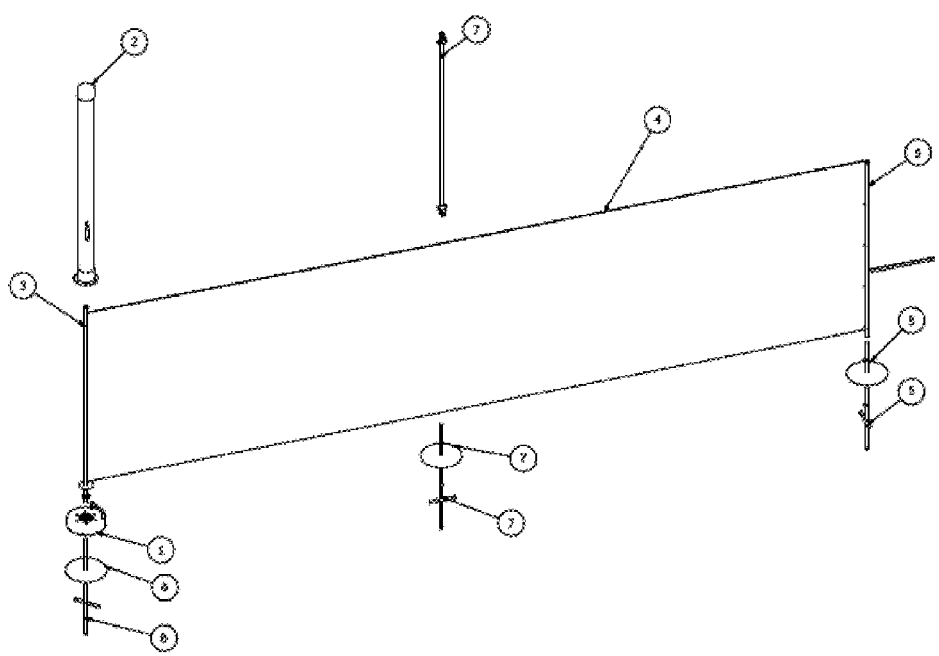
FIGS. 5A and 5B, collectively referred to as FIG. 5, are detailed diagrams of an embodiment of the shield apparatus.
Figure 5B:
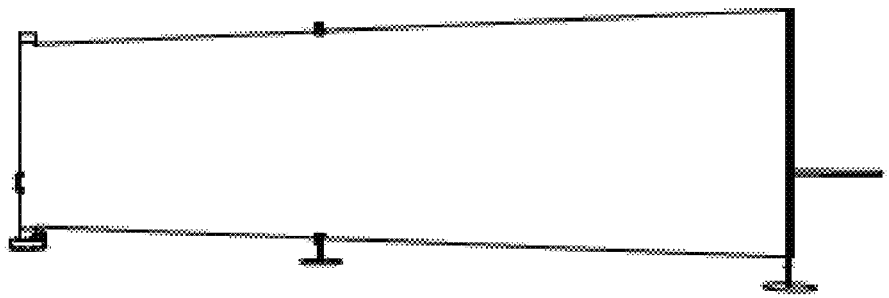

FIG. 5 shows detailed schematic diagrams of an embodiment of the safety apparatus similar to that shown in FIG. 4. The apparatus is shown having a base with retraction mechanism, as indicated by reference number 1. Other items shown include: a screen spindle 2; a screen housing 3; a hardscape base; primary; a softscape base, primary; a midspan support 6; a screen end support 7; two hardscape bases, auxiliary 8; and two softscape bases, auxiliary 9. Notably, the reference numbering and nomenclature convention for FIGS. 5 and 6 departs from the reference numbering convention of FIGS. 1-4.

FIG. 6 show detailed schematic diagrams of a spindle assembly and a base assembly with retraction mechanism, respectively, both in exploded view. The reference numbering and letter convention for FIG. 6 departs from the reference numbering convention of FIGS. 1-4 as well as the reference numbering convention of FIG. 5.

Figure 6A:
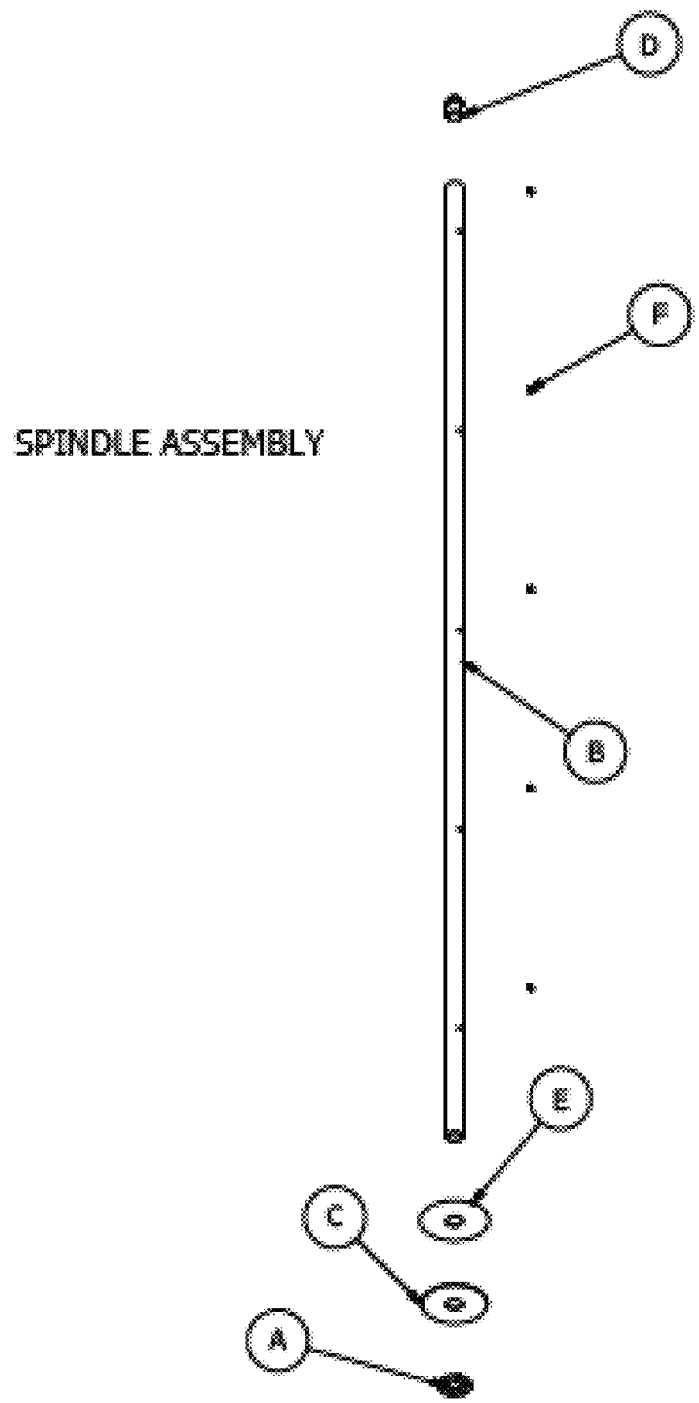
FIGS. 6A and 6B, collectively referred to as FIG. 6, are detailed diagrams of a spindle assembly and a base assembly with retraction mechanism, respectively, both in exploded view.

FIG. 6A shows a spindle assembly. The assembly includes a spindle shaft base_B A, a spindle shaft B, a screen support C, a spindle bearing adapter D, and a dust shield E. Also included are five riveted snaps F.

Figure 6B:
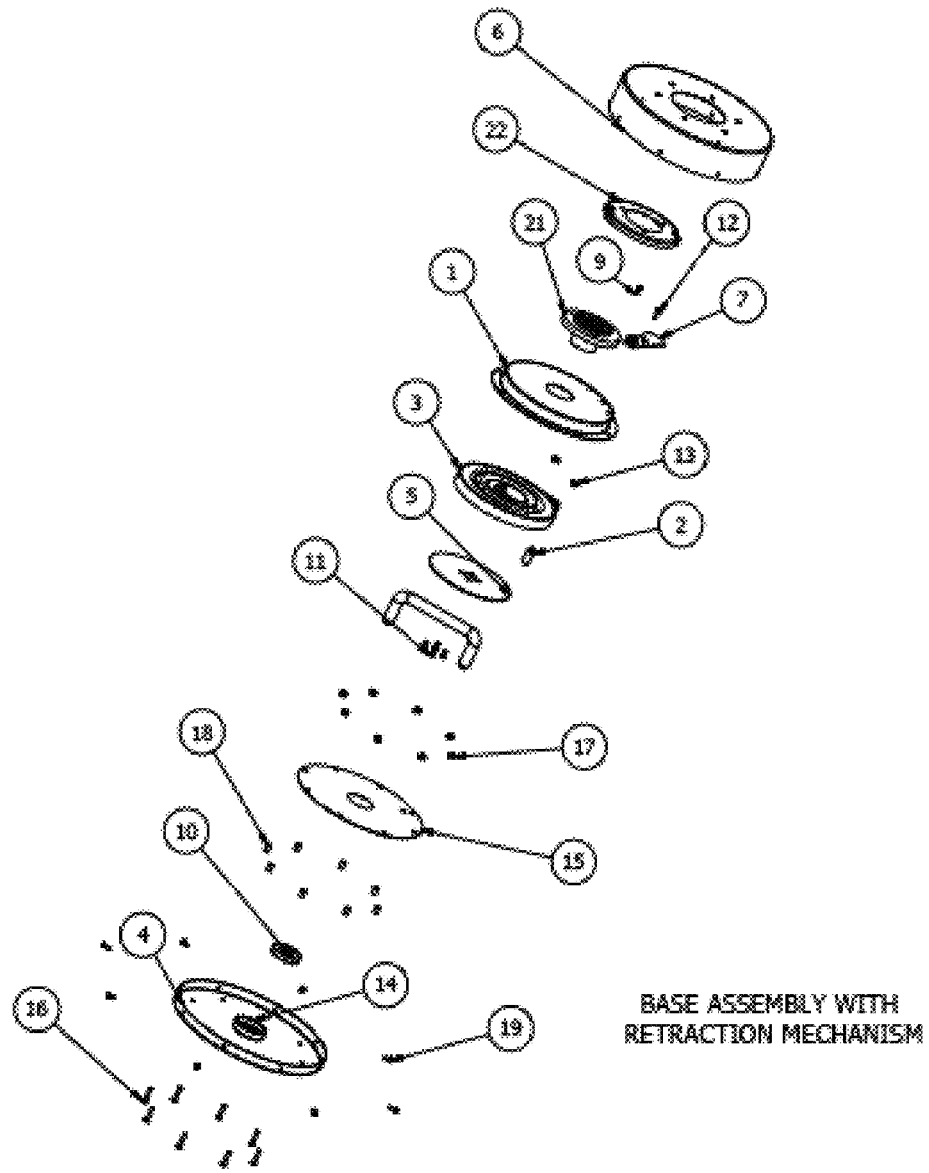

FIG. 6B shows a base assembly with retraction mechanism. Include are one of each of the following: spin cover 1; spring retention pin 2; retraction spring 3; base bottom 4; hub retaining plate 5; base cover 6; spindle rocker asy 7; #10-32-1/2 9; R16 bearing 10; 10-32-UNFx.5 12; bearing housing, welded to base bottom 14; spring base plate 15; bearing & spring arbor 21; latch cam 22; and handle_mcmaster 32. Also included are two of each of the following: 10-32 nyloc hex nut 13; and cls-0420-1. Further included are four ohub retention screws, 10-32 unc x 0.5 11. Eight of each of the following are further included: base bottom screws, 10-32-1 16, IFI 100/107-no.10-32 metal type 17; standoff, spring sub-asy 18; and #10-32-1/2 19. The retraction mechanism may consist essentially of items 3, 7, 21 and 22.

The retraction mechanism may include a clutch assembly with an automatic assist. For example, the retraction mechanism may automatically assist to retract the screen by way of rotational motion. The automatic assist may include a coil spring that winds up as the screen is expanded. The spring provided the force for automatic assisting retraction of the screen. In addition, the retraction mechanism has a construction such that the second support may be automatically locked relative to and automatically pulled toward the first support, as desired. Such locking action may involve the use of a ratchet arranged so that a second pull will unlock the ratchet and allow the screen to retract.

FIG. 7 shows alternative bases that may be used in connection with the invention. None of these bases constitute off-the-self items. Instead, the bases shown represent specially produced items customized for the invention. For example, FIG. 7A shows a base 100 having a hardscape construction. As shown, a disk 108 is provided having a vertical rod 102 extending upward therefrom. The rod 102 is insertable up to a bulge 104 into a lower end of the first (or second) support 10. As a result, the second support is elevated off the disk 108 via rod segment 106.

Figure 7A:
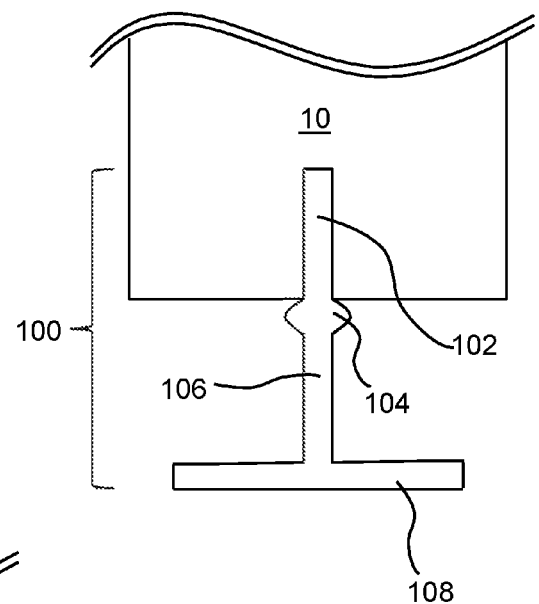
FIGS. 7A-7D, collectively referred to as FIG. 7, depict in cross sectional view various bases that may be inserted into supports of the invention.
Figure 7B:
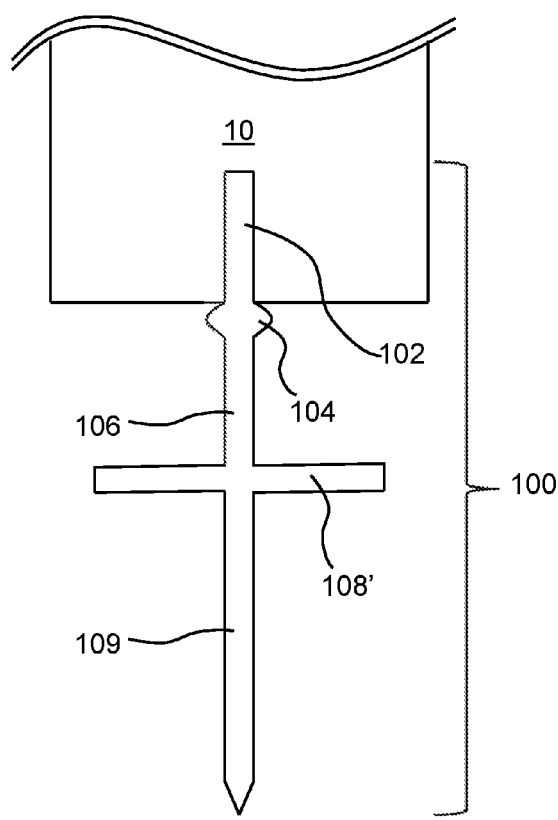

FIG. 7B shows a base of a softscape construction. The base 100 comprises a stake 109 and a crossbar 108' that a landscaper may use to apply pressure to insert the stake 109 into the ground. Located above the crossbar 108' is a vertical rod 102 insertable up to a bulge 104 into a lower end of the first (or second) support 10.

Figure 7C:
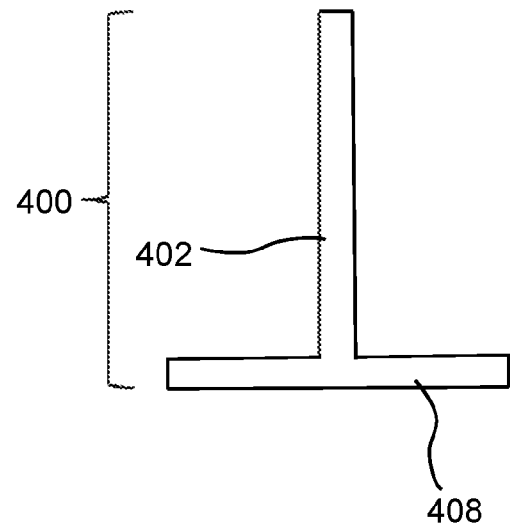

FIG. 7C shows an additional hardscape base 400 having vertical rod 402 extending upward from a disk 408. The rod 402 is insertable into the lower end of the at least one additional support, i.e., the adjusting pole. Notably, no budge is present in the rod.

Figure 7D:
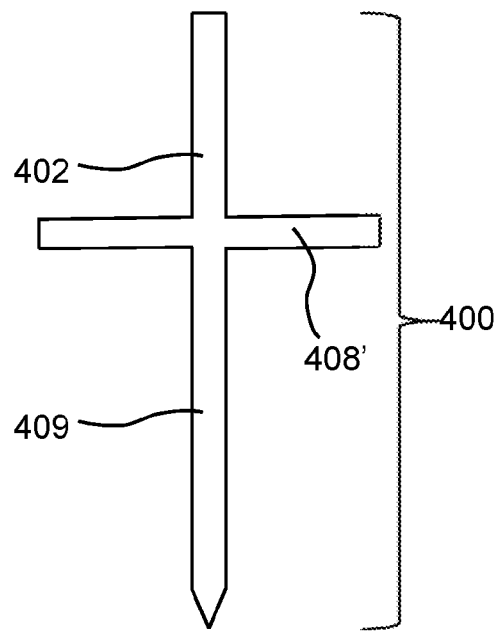
Figure 8:
FIG. 8 is a photograph of a set of bases for the invention.

FIG. 7D shows an additional base 400 similar to that depicted in FIG. 7C, except that the disk is replaced by a crossbar 404'. A stake 409 extends downward from the cross bar 408'. The rod 402 is insertable into the lower end of the at least one additional support, i.e., the adjusting pole. Again, no budge is present in the rod FIG. 8 is a photo that shows a set of bases of the invention. The hardscape bases weigh about 9 to about 10 pounds each, e.g., about 9.5 pounds each. The softscape bases weigh about 3 to about 4 pounds each, e.g., about 3.7 pounds each. The adjusting pole stake weights about 3.5 pounds, as does the adjusting pole.

Notably, such bases allow for the invention to be used a novel and nonobvious ways. For example, the construction of the bases allows the first support to pivot 360 degrees in any direction. In addition, the invention allows for the inventive screen to engage in shimmying action so as to cover a large distance by successive and selective movement of the bases. For example, rods of first and second bases may be inserted into first support and second supports. Then, the apparatuses may be placed such that the supports span a distance of about 10 to 20 feet from each other to allow the screen to block debris hurled by the landscaping device from the hitting passersby, bystanders and/or property located outside the grounds region where the device is operated. Once the device user is finished with that particular grounds region, the first support and first base may be relocated without relocating the second support and the second base. As a result, the apparatus is effectively shimmied to a neighboring landscaping region for blocking hurled debris therefrom. Such shimming action may be carried out further by then relocating the second support and the second base without relocating the first support and the first base. That way, the inventive shield may be used with yet another neighboring landscaping region.

The shield apparatus is useful in numerous industries. A non-exclusive list of industries in which the shield apparatus would be useful includes, landscaping/horticulture, construction, industries in which debris may be generated and/or hurled by motorized equipment, and other industries with the need for a shield. The term "debris" is used herein in its ordinary sense and refers to small pieces or fragments of something, e.g., pebbles, small rocks, rubble, glass, pieces of tree bark, or small pieces of improperly discarded items found on grounds regions where work such as landscaping activities may occur. Exemplary debris that may be generated and/or hurled during the use of landscaping and/or gardening equipment include, for example, pebbles, masonry pieces, glass fragments, sand, nails, etc. The term "hurl" is used herein in its ordinary sense and refers to propelling, throwing, launching, bouncing, etc., into the air by any means.

The shield apparatus is useful in numerous places. A non-exclusive list of examples of places where the shield apparatus is useful includes places where landscape maintenance is being conducted, e.g., schools, apartment complexes, business parks, etc.

In some embodiments, the shield apparatus is used in the landscaping/horticulture industry to block debris hurled by landscaping tools, such as mowers, blowers, rototillers, and string trimmers. In some such embodiments, the shield apparatus may be constructed and used to block debris hurled by a string trimmer. The term "string trimmer" is used herein in its ordinary sense to broadly describe a powered handheld device that uses a "string," such as a flexible monofilament line, instead of a blade for cutting grass and other plants near objects. String trimmers typically include a cutting head at the end of a long shaft with a handle or handles. In use, the head of string trimmers spins the string at a high rate of speed to cut plant matter. Some string trimmers are used to cut quite large woody plants such as small shrubs.

Because the head of a string trimmer spins at a high rate of speed, objects such as debris may be hurled at extremely high velocities and or with great force, thereby causing damage to people, cars and or buildings, etc. While the user of a string trimmer may use standard protective gear for use with power tools such as safety glasses, goggles, a face shield gloves, and lower leg guards, these will not protect other people in the area such bystanders or passersby, nor the property in the area. Additionally, some string trimmers may include attached guards or shields on the string trimmer device itself. However, these guards or shields do not block all debris arising from the operation of trimmers. Thus, debris may still be hurled and injure other people in the area and property.

In embodiments in which the shield apparatus is used with a string trimmer, the shield apparatus may be transported to a grounds region where a device prone to hurl flying debris may be used. The supports are positioned in a substantially vertical position at different locations in the region, while the screen is maintained in a substantially taut manner between the supports. The screen may serve to block debris hurled during use of the device in the region. Once work is completed, the retraction mechanism may be activated to retract the support attached to one vertical edge of the screen to the opposing vertical edge.

Depending on the intended use of the apparatus shield, the construction of the screen used in the apparatus shield, such as the screen's dimensions, strength, and composition, may vary. The height of the screen may also vary depending on its use. For example, in some embodiments, when the invention is used to protect bystanders, the screen may have a height greater than that of the bystanders. For example, in some embodiments used to protect children, a screen having a height of about 4 feet or more may be used. In other embodiments also used to protect adults, a screen having a height of up to about 7 feet may be adequate to protect most adult bystanders. For embodiments that are portable, an excessive height may be undesirable. These dimensions are exemplary and are not meant to be limiting. One of skill in the art would be able to assess the proper height for the particular use of the shield apparatus without undue experimentation.

The length of the screen may also vary according to the intended use of the shield apparatus. For example, for some embodiments the screen should have a sufficiently long length so that the user does not have to move the screen often during use. For example, in some embodiments depending on the use, the screen may have a length of at least about ten to twenty feet or more when completely extended. In some embodiments, one more additional supports and bases may be required because of the length of the screen and the material of the screen. These dimensions are exemplary and are not meant to be limiting. One of skill in the art would be able to assess the proper length for the particular use of the shield apparatus without undue experimentation.

Any of a number of commercially available materials may be used as long as the material can be made sufficiently strong for the apparatus's intended use. For example, polymeric materials such as nylon and polyester may be found in mesh form. Similarly, materials used in windows for insect screening such as aluminum and fiberglass may be used as well. Less common mesh materials that may be used include bronze, copper, brass, stainless steel, and galvanized steel. Naturally occurring cloth fabrics, e.g., cotton and burlap, and synthetic films such as polyethylene and polypropylene may be used as well.

For landscaping/horticulture applications, the shield should have a construction (i.e. enough strength and dimension) that allows the screen, when rendered taut between the supports, to block debris hurled by a landscaping device e.g., tools with an electrical motor and/or a gas-powered engine.

Exemplary power landscaping tools known to generate debris include, for example, string trimmers, leaf blowers, mowers, rototillers, etc.

Through routine experimentation in view of the manufacturer's specification for such tool, persons of ordinary skill in the art would be able to determine a suitable screen without undue experimentation. For example, commercial gas-powered string trimmers have 1.6 horse-power two-stroke engine with a 33.6 cubic centimeter displacement. Nylon mesh may be successfully used in the context of the inventive apparatus to prevent debris generated by the spinning head of such string trimmers. Another material that may be used for the screen in a shield apparatus, which is used to block debris such as that hurled by a string trimmer, is a charcoal fiberglass mesh screen, such as the one sold by Phifer, Inc. Another material that may be used for a screen in a shield apparatus that is may be used with a string trimmer is a vinyl-coated polyester screen, such as the SunTex® 80 screen with a breaking strength of 400 warp and 380 fill or SunTex® 90 screen with a breaking strength of 480 warp and 340 fill sold by Phifer, Inc. Screens within such a range of warps and fills may be used as well. In some instances, openings in the screen may not exceed an area of about 1/40 square inch. These examples are provided as illustrations of example materials and are not meant to be limiting. One of skill in the art would be able to assess a proper material for the screen without undue experimentation.

Depending on the intended use of the inventive apparatus, the screen may vary in permeability. Typically, a wind permeable material may be desired for outdoor use, as it may be difficult to maintain a wind-impermeable screen in a taut vertical orientation between the supports when the weather does not permit. However, mesh sizes should not be so excessive such that the ability of the screen to block debris is compromised. Upon routine experimentation, persons of ordinary skill in the art would be able to select a screen material with appropriate wind and/or debris permeability.

Similarly, the screen may vary in appearance depending on aesthetic and/or functional consideration. For example, the screen may be colored green, a color associated with landscaping. In addition, the screen may also serve to warn bystanders from approaching the grounds regions where work may take place. Such warnings may be communicated via printed text, symbols, and/or colors ordinarily associated with caution and/or safety, e.g., yellow or orange or black, etc. Optionally, the screen may be see-through, opaque, or anything in between.

Variations of the present invention will be apparent to those of ordinary skill in the art in view of the disclosure contained herein. For example, the invention is not limited to the area of landscaping/horticulture. In addition, the retraction mechanism is a particularly nonobvious feature of the invention because it is no trivial matter to produce a mechanism that reliably retracts a screen of a size appropriate for the invention. Furthermore, the inventive apparatus may be constructed to contain or exclude specific features and components according to the intended use of the apparatus, and any particular embodiment of the invention, e.g., those depicted in any drawing herein, may be modified to include or exclude element of other embodiments. Alternatively, stated, different features of the invention described above may be combined in different ways.

While the invention has been described in conjunction with the preferred specific embodiments thereof, the foregoing description merely illustrates and does not limit the scope of the invention. Numerous alternatives and equivalents exist which do not depart from the invention set forth above. Other aspects, advantages, and modifications within the scope of the invention will be apparent to those skilled in the art to which the invention pertains.

What is claimed is:

1. A landscaping device and shield apparatus combination, comprising:
    a landscaping device powered by an engine and/or motor capable of hurling debris during operation up to a height of at least about 18 inches; and
    a shield apparatus, comprising
        first and second supports, each support having an upper end and a lower end,
        first and second bases each having a rod insertable up to a bulge thereof into the lower ends of the first and second supports, respectively, the bases having a construction to maintain the supports in a substantially vertical orientation above the bulges,
        a flexible screen having opposing vertical edges attached to the first and second supports, the screen effective to block debris hurled by the landscaping device from traveling through the screen, and
        a retraction mechanism associated with the first support,
    wherein the landscaping device excludes a stump grinder and is, during operation, located within about 20 feet of the shield apparatus, and
    further wherein
        each of the first and second bases is selected from a set of hardscape and softscape bases,
        each hardscape base has a hardscape construction comprising a disk having a vertical rod insertable up to the bulge of the hardscape base into the lower ends of the first or second supports, and
        each softscape base has a softscape construction comprising a stake and a crossbar located below a vertical rod insertable up to the bulge of the softscape base into the lower ends of the first or second supports.

2. The combination of claim 1, wherein the screen has a height of about 4 feet to about 7 feet.

3. The combination of claim 1, wherein the screen comprises a polymeric material.

4. The combination of claim 1, wherein the screen is wind permeable.

5. The combination of claim 1, wherein the screen has about a 400 to about a 480 warp.

6. The combination of claim 1, wherein the screen has about 340 to about 380 fill.

7. The combination of claim 1, wherein the device is a handheld device.

8. The combination of claim 7, wherein the device is a trimmer or blower.

9. The combination of claim 8, wherein the device is a string trimmer.

10. The combination of claim 1, wherein at least one of the first and second bases has the hardscape construction comprising.

11. The combination of claim 1, wherein at least one of the first and second bases has the softscape construction.

12. The combination of claim 1, further comprising
    at least one additional support having an upper end and a lower end and being physically associated with a portion of the screen located between the opposing vertical edges, and
    an additional base having a vertical rod insertable into the lower end of the at least one additional support.

13. The combination of claim 1, wherein no support is located at a distance greater than about 20 feet from at least one other support.

14. The combination of claim 1, wherein the retraction mechanism retracts the screen by way of rotational motion.

15. The combination of claim 1, further comprising a housing associated with the first support and/or retraction mechanism.

16. The combination of claim 15, wherein the housing is integral to the first support.

17. The combination of claim 16, wherein the housing has a size effective to contain the entire screen upon retraction.

18. The combination of claim 17, further comprising a first handle attached to the housing, and a second handle attached to the screen and/or the second support.

19. A landscaping method, comprising:
(a) identifying a grounds region for using a landscaping device powered by an engine and/or motor capable of hurling debris during operation up to a height of at least about 18 inches;
(b) transporting a shield apparatus to the region, the shield apparatus comprising:
   first and second supports, each support having an upper end and a lower end,
   first and second bases each having a rod insertable up to a bulge into the lower ends of the first and second supports, respectively, the bases having a construction to maintain the supports in a substantially vertical orientation above the bulges,
   a flexible screen having opposing hems attached to the first and second supports, the screen having sufficient strength to block debris hurled by the device from traveling through the screen, and
   a retraction mechanism associated with the first support;
(c) inserting the rods of the first and second bases into the lower ends of the first and second supports;
(d) positioning the first and second supports in a substantially vertical orientation at different locations bounding the region while automatically locking the screen in a substantially taut manner between the supports;
(e) using the handheld landscaping device in the region at a location no greater than about 20 feet from the apparatus, thereby allowing the apparatus to blocking debris hurled by the apparatus up to a height exceeding at least about 18 inches from hitting passersby, bystanders and/or property located outside the grounds region; and
(f) activating the retraction mechanism to pull the second support toward the first support,
wherein
   each of the first and second bases is selected from a set of hardscape and softscape bases,
   each hardscape base has a hardscape construction comprising a disk having a vertical rod insertable up to the bulge of the hardscape base into the lower ends of the first or second supports, and
   each softscape base has a softscape construction comprising a stake and a crossbar located below a vertical rod insertable up to the bulge of the softscape base into the lower ends of the first or second supports.

20. A shield apparatus kit, comprising:
first and second supports, each support having an upper end and a lower end;
a set of hardscape and softscape bases for the first and second supports, each base having a rod insertable up to a bulge into the lower ends of the first and second supports, respectively, to maintain the first and second supports in a substantially vertical orientation above the bulges,
a flexible screen having opposing vertical edges attached to the first and second supports, the screen effective to block debris hurled by the landscaping device from traveling through the screen;
at least one additional support having an upper end and a lower end and being physically associated with a portion of the screen located between the opposing vertical edges;
a set of hardscape and softscape bases for the at least one additional support, each base having a rod insertable into the lower end of the at least one additional support to maintain the at least one additional support in a substantially vertical orientation; and
a retraction mechanism associated with the first support,
wherein the set of hardscape and softscape bases comprise
   hardscape bases each having a hardscape construction comprising a disk having a vertical rod insertable up to the bulge of the hardscape base into the lower ends of the first or second supports, and
   softscape bases each having a softscape construction comprising a stake and a crossbar located below a vertical rod insertable up to the bulge of the scopescape base into the lower ends of the first or second supports.

* * * * *